(12) United States Patent
Hiraguchi et al.

(10) Patent No.: US 7,997,519 B2
(45) Date of Patent: Aug. 16, 2011

(54) RECORDING TAPE CARTRIDGE

(75) Inventors: Kazuo Hiraguchi, Odawara (JP); Kiyoo Morita, Odawara (JP); Kenji Takenoshita, Odawara (JP)

(73) Assignee: FUJIFILM Corporation, Tokyo (JP)

( * ) Notice: Subject to any disclaimer, the term of this patent is extended or adjusted under 35 U.S.C. 154(b) by 13 days.

(21) Appl. No.: 12/212,252

(22) Filed: Sep. 17, 2008

(65) Prior Publication Data
US 2009/0084881 A1     Apr. 2, 2009

(30) Foreign Application Priority Data

Sep. 28, 2007   (JP) ................. 2007-253341

(51) Int. Cl.
    *G11B 23/107*   (2006.01)
(52) U.S. Cl. .............. 242/348.2; 242/332.4
(58) Field of Classification Search .......... 242/348, 242/348.2, 332.4, 532.6; 360/132
    See application file for complete search history.

(56) References Cited

U.S. PATENT DOCUMENTS

| | | | |
|---|---|---|---|
| 6,505,789 B2 * | 1/2003 | Ridl et al. ............... | 242/348.2 |
| 6,918,556 B2 * | 7/2005 | Ishihara ................. | 242/348.2 |
| 7,243,871 B2 * | 7/2007 | Moses et al. ............ | 242/348.2 |
| 7,475,839 B2 * | 1/2009 | Hiraguchi et al. ....... | 242/348.2 |
| 7,559,500 B2 * | 7/2009 | Hiraguchi ............... | 242/348.2 |
| 7,562,839 B2 * | 7/2009 | Takenoshita et al. ..... | 242/332.4 |
| 2004/0031871 A1 * | 2/2004 | Satoh et al. ............. | 242/348.2 |
| 2004/0041051 A1 * | 3/2004 | Ishihara ................. | 242/348.2 |

FOREIGN PATENT DOCUMENTS

| | | |
|---|---|---|
| JP | 11-339433 A | 12/1999 |
| JP | 2001-148179 A | 5/2001 |
| JP | 2003-208773 A | 7/2003 |
| JP | 2004-319031 A | 11/2004 |

OTHER PUBLICATIONS

Japanese Office Action dated Jun. 14, 2011, corresponding to Japanese Application No. 2007-253341.

* cited by examiner

*Primary Examiner* — William A Rivera
(74) *Attorney, Agent, or Firm* — Sughrue Mion, PLLC

(57) ABSTRACT

A recording tape cartridge is provided with a case rotatably accommodating a reel around which a tape is wound and including an opening from which the tape may be drawn out, a leader portion including guard portions disposed at both ends thereof in a width direction of a tape, recessed housing portions formed in the case as a vertical pair that face the opening and that allow the guard portions to be inserted, and a pair of leader holding members that form part of respective pin receiving portions together with the recessed housing portions. Each leader holding member includes, integrally, a fixed portion fixed to the inside of the case, a retaining spring that engages with one of the guard portions in one of the recessed housing portions from the opening side thereof, and an overhanging portion that covers the guard portion in one of the recessed housing portions.

18 Claims, 14 Drawing Sheets

RECORDING TAPE CARTRIDGE

CROSS-REFERENCE TO RELATED APPLICATION

This application claims priority under 35 USC 119 from Japanese Patent Application No. 2007-253341, the disclosure of which is incorporated by reference herein.

BACKGROUND OF THE INVENTION

1. Field of the Invention

The present invention relates to a recording tape cartridge that rotatably houses, in a case, a reel around which a recording tape is wound.

2. Description of Related Art

A magnetic tape cartridge is known in which a leader pin is attached to the leading end of a magnetic tape wound around a single reel housed in a case and in which, by storing fixed end portions formed projectingly at each end of the leader pin in a length direction of the leader pin, in undercut grooves formed in the upper and lower walls of the case, the leader pin may be held relative to the case (see Japanese Patent Application Laid-Open (JP-A) No. 2001-148179). This magnetic tape cartridge can prevent the leader pin inclining with respect to the case, and can prevent an opening portion (an unconnected portion) in the case for inserting and removing the leader pin, from widening. Also known in the field of magnetic tape cartridges is a position-fixing structure for an elastic holding member that increases the positional accuracy of an elastic holding member in relation to the cartridge body and that stabilizes a force that anchors the leader pin (see JP-A No. 2004-319031). In this magnetic tape cartridge, the elastic holding member that anchors the upper and lower ends of the leader pin is a separate element.

However, in conventional magnetic tape cartridges such as the former of those described above, a tapered or stepped undercut groove is formed by forming a thin resin portion in the case, and potential deformation of this thin resin portion is a cause for concern with respect to preventing the case opening portion from widening. Further, in the latter tape cartridge, the opening portion cannot be prevented from widening.

SUMMARY OF THE INVENTION

The present invention considers the above facts, and addresses the provision of a recording tape cartridge that can ensure case strength while preventing a case opening portion from opening.

A first aspect of the present invention is a recording tape cartridge, including: a reel around which a recording tape is wound; a case rotatably housing the reel, and including an opening from which the recording tape may be drawn out; a leader member including a tape connection portion which is connected to the recording tape directly or via a leader tape, and a pair of guard portions (outer flanges) respectively provided at portions of the tape connection portion that respectively project further toward width direction outer sides than both width direction edges of the recording tape; a pair of leader receiving portions formed in the case and facing the opening, that respectively receive the corresponding guard portions of the leader member such that the guard portions may be detached towards the opening side; and a pair of leader holding members, each provided integrally with a fixed portion fixed inside the case, a retaining spring portion that engages one of the guard portions from the opening side when the one of the guard portions is received by one of the leader receiving portions, and an overhanging portion that overhangs, from a recording tape side, the one of the guard portions which has been received by the one of the leader receiving portions.

In the above first aspect of the tape cartridge of the present invention, while the recording tape is housed in the case, guard portions of a leader member, which are disposed at outer sides of either edge in a width direction of the recording tape, are inserted into leader receiving portions, and are also covered by overhanging portions of a leader holding member. Further, movement of the guard portions of the leader member towards the case opening side is restricted by retaining spring portions of a leader holding member. In this recording tape cartridge, when deformation occurs at the opening in an opening direction thereof, since the guard portions of the leader member engage with the overhanging portions, deformation of the case opening in the opening direction can be suppressed. When the recording tape is pulled out of the case, the leader member moves towards the case opening side, the guard portion is separated from the leader receiving portion, and following this, the recording tape is pulled out of the case in conjunction with the movement of the leader member.

In the present recording tape cartridge, the leader holding members that are separate from the case include a fixed portion that is fixed to the case. Since the overhanging portions, which are provided integrally with the fixed portions, are disposed to cover the guard portions inside the leader receiving portions, the overhanging portions do not have to be provided at the case as thin portions. Thus, sufficient strength can be imparted to a case having a structure including an overhanging portion.

In this way, the recording tape cartridge of the first aspect of the present invention can ensure that a case has sufficient strength, while at the same time preventing an opening portion of the case from widening. Further, since the overhanging portions and the retaining spring portions respectively share the fixed portions, the positional accuracy of retaining spring portions and overhanging portions with respect to leader receiving portions can be more easily ensured.

In the first aspect of the recording tape cartridge of the present invention, position-fixing structures may be provided that fix the position of the overhanging portions, or portions between the overhanging portions and fixed portions, of the pair of leader holding members, with respect to the leader receiving portions.

In the above leader member, since positions of the overhanging portions, or portions between the overhanging portions and fixed portions, are fixed by position-fixing structures, that is, since the leader holding members are fixed in the proximity of the leader receiving portions by position-fixing structures, the positional accuracy of the retaining spring portions and the overhanging portions with respect to the leader receiving portions can be increased.

In the recording tape cartridge of the first aspect of the present invention, the leader receiving portions are recessed portions formed in the case, and the retaining spring portions of the pair of leader holding members are each formed such that they stand vertically at the recording tape side of the fixed portions. A pair of spring grooves that communicate with the leader receiving portions and that individually house the retaining springs, and a pair of fixed portion recessed portions that communicate with the spring grooves and that individually house the fixed portions, may also be formed in the case.

In the recording tape cartridge described above, leader receiving portions, spring grooves and fixed portion recessed portions are formed in each of a pair of flat plate portions of the case opposing each other in a width direction of the recording tape as recessed portions that are recessed in a thickness direction of the flat plate portions. Retaining spring portions stand vertically towards the recording tape side (towards a portion of the leader member that connects with the tape) from the fixed portions housed in the fixed portion recessed portions, are positioned inside the spring grooves, and engage with the guard portions inside the leader receiving portions.

In the recording tape cartridge of the first aspect of the present invention, the leader receiving portions are recessed portions formed in the case, and the retaining spring portions of the pair of leader holding members are each formed such that they may each stand vertically at sides opposite to the recording tape side of the fixed portions. A pair of spring grooves that communicate with the leader receiving portions and that individually house the retaining springs, may also be formed in the case.

In the recording tape cartridge described above, leader receiving portions and spring grooves are formed in each of a pair of flat plate portions of the case opposing each other in a width direction of the recording tape as recessed portions that are recessed in a thickness direction of the flat plate portions. Retaining spring portions positioned inside the spring grooves respectively stand vertically from the fixed portions at the leader holding member towards sides respectively opposite to the recording tape side, and engage with the guard portions inside the leader receiving portions. Due to this, there is no need to provide a thin portion in the case that houses a fixed portion of the leader holding member, and it is possible to avoid thinning a fixing region of the case.

In the recording tape cartridge of the first aspect of the present invention described above, the pair of leader members may be formed of metal.

In the recording tape cartridge configured as above, since the leader holding member is made of metal, it is possible to ensure a required level of strength while making the fixed portion or the overhanging portion thin. In other words, a thin fixed portion or overhanging portion can ensure a required level of strength and, in particular, of strength for preventing the opening of the case from widening.

The recording tape cartridge of the present invention described above has the advantageous effect of ensuring the strength of the case while also preventing a case opening portion from widening.

DETAILED DESCRIPTION OF THE INVENTION

The recording tape cartridge 10 according to the first embodiment of the present invention will now be explained with reference to FIGS. 1 through 8. First, the outline of the entire structure of the recording tape cartridge 10 will be explained, then a leader pin 20 (a leader member) will be explained, and then the structure that holds the leader pin 20 in relation to the case 12, which is the main portion of the present invention, will be explained in detail. Further, for ease of explanation, the direction indicated by arrow A, that is, the direction in which the tape cartridge 10 is loaded to a drive device, will be referred to as the front direction (front side), while the directions indicated by arrow B and arrow C, each of which intersect arrow A at right angles, will respectively be referred to as a right direction and an upwards direction.

(Entire Structure of Recording Tape Cartridge)

Figure 7:
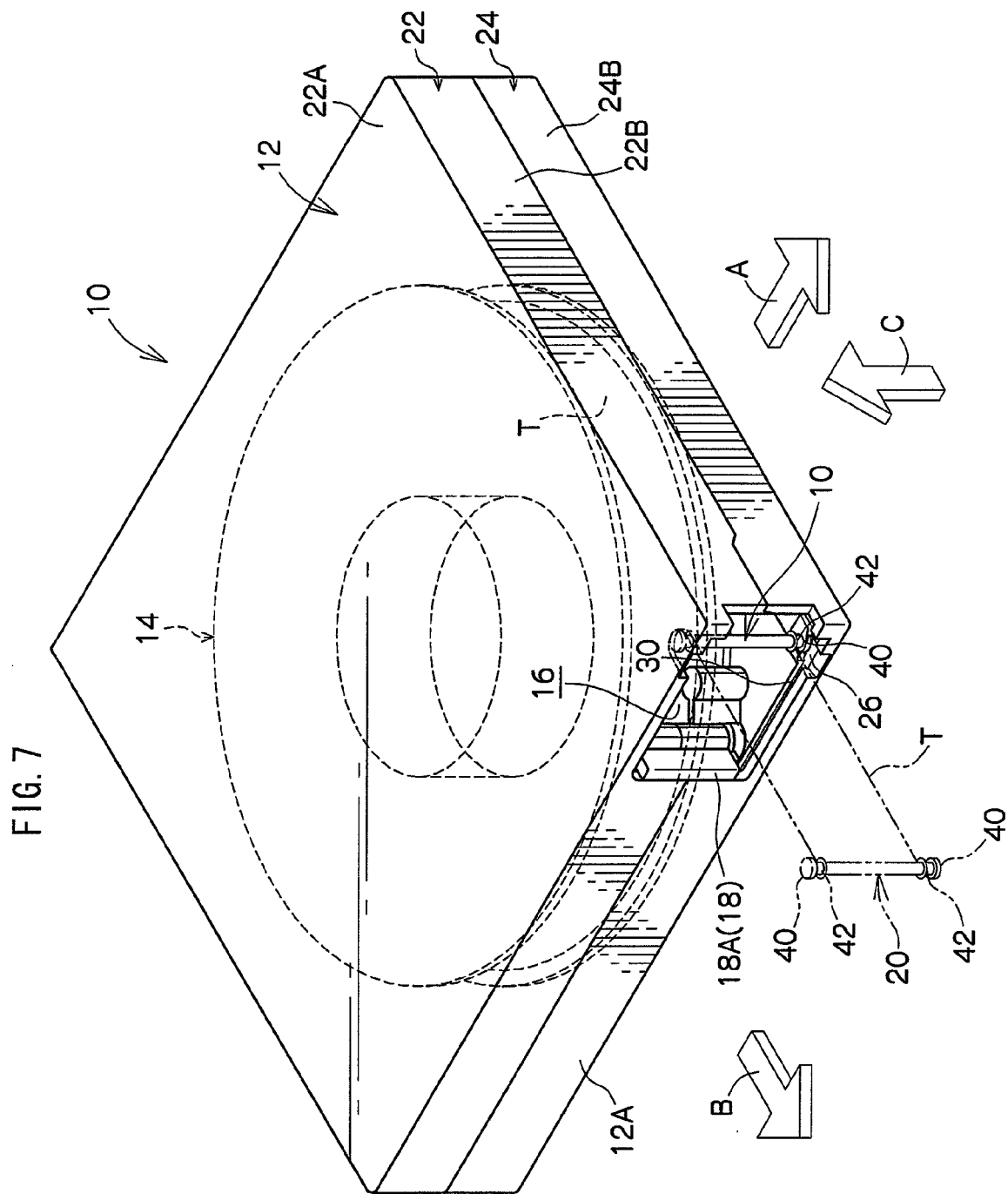
FIG. 7 is a perspective view showing an outline of the entire structure of the recording tape cartridge according to the first embodiment of the present invention.
Figure 8:
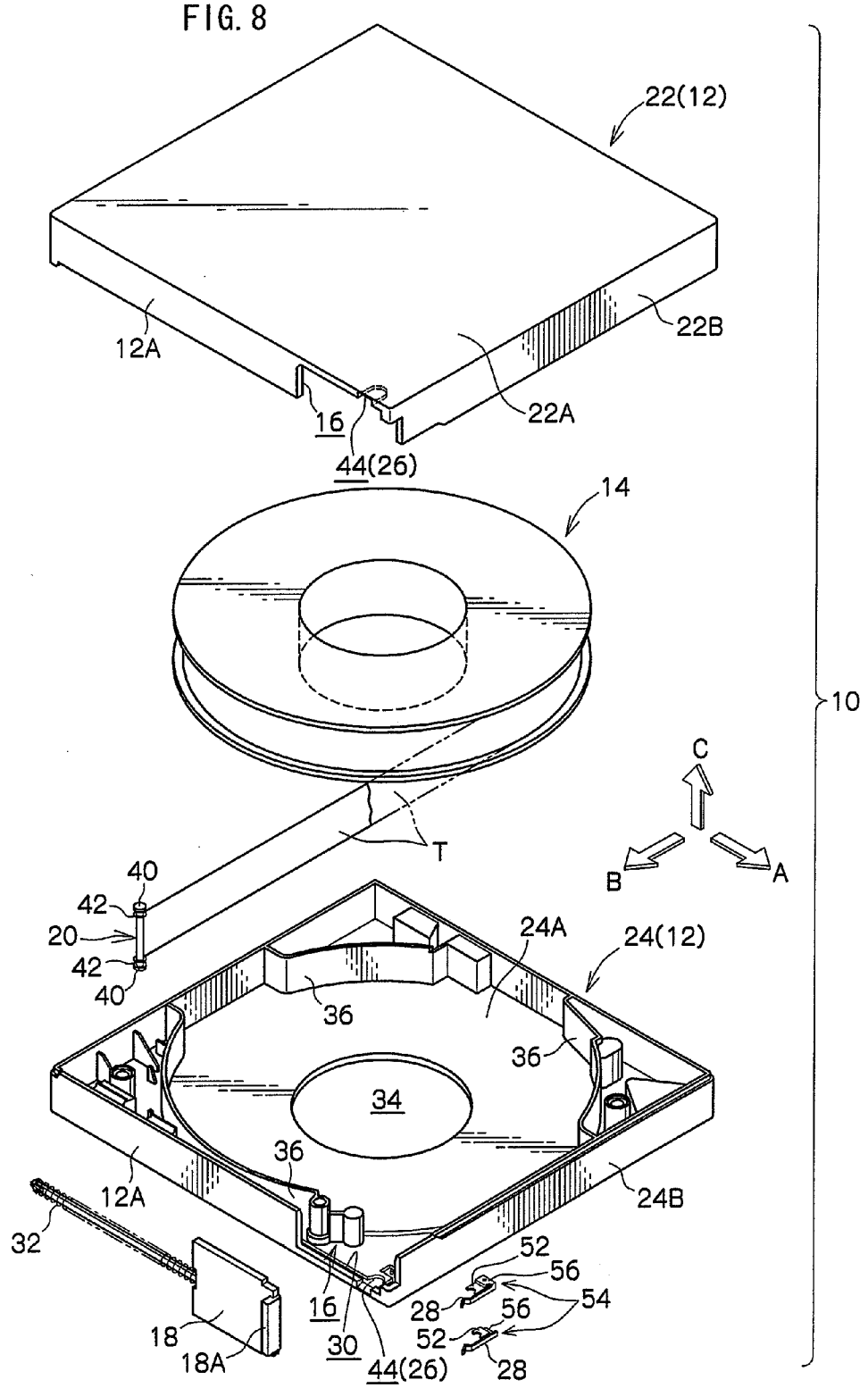
FIG. 8 is an exploded perspective view showing the recording tape cartridge according to the first embodiment of the present invention.

In FIG. 7, the entire structure of the recording tape cartridge 10 is shown in a perspective view, while in FIG. 8, the recording tape cartridge 10 is shown in a schematic exploded perspective view. As shown in these drawings, the recording tape cartridge 10 includes a case 12 which is substantially rectangular in plan view and which rotatably houses a single reel 14 on which a magnetic tape T is wound as a recording tape which is an information recording and playback medium.

At a front edge portion of a right side wall of the case 12, there is an opening portion 16 for drawing the magnetic tape T out of the case 12. When the recording tape cartridge 10 (recording tape T) is not in use, the opening portion 16 is sealed by the door 18, and when the recording tape cartridge 10 is in use, the opening portion 16 is open when inside a drive device. Further, a leader member including a leader pin 20, which is described in detail below, is attached to the end of the magnetic tape T. The leader member may be a leader pin 20 directly connected to the end of the magnetic tape T, or a structure in which a leader tape which is directly connected to the end of the magnetic tape T is combined with a leader pin 20 directly connected to the other end of the leader tape. When the recording tape cartridge 10 is loaded in a drive device, the leader pin 20 is hooked by a withdrawing mechanism of the drive device, and the magnetic tape T is thereby drawn out of the case 12.

The case 12 includes an upper case 22 joined with a lower case 24. The upper case 22 includes a top plate 22A which is substantially rectangular in plan view and a peripheral wall 22B that runs around the outer edge of the top plate 22A and that is substantially frame shaped. The lower case 24 includes a base plate 24A, the shape of which substantially corresponds to the top plate 22A, and a peripheral wall 24B which runs around the outer edge of the base plate 24A. The case 12 is formed by joining the upper case 22 and the lower case 24 by ultrasonic welding or screw fastening, such that the open edges of the peripheral wall 22B and the peripheral wall 24B meet together, thus forming a substantially rectangular vertically flattened box.

Opening portion 16 is substantially rectangular in side view, and is disposed facing to the right near the front end of the right side wall 12A of the case 12, said wall running along the direction of arrow A (that is, the right-facing wall of the case 12 formed from the peripheral wall 22B and the peripheral wall 24B). At the top plate 22A and base plate 24A, leader pin receiving portions 26 are respectively provided and individually house outer flanges 40 (described below) of the leader pin 20 which stands vertically. Although described in detail below, each pin receiving portion 26 is open towards the right near the front edge of the opening portion 16; that is, they open towards the opening portion 16, and they make possible the attachment and detachment (insertion and extraction) of the leader pin 20 with respect to the case 12 via the opening portion 16.

Figure 6:
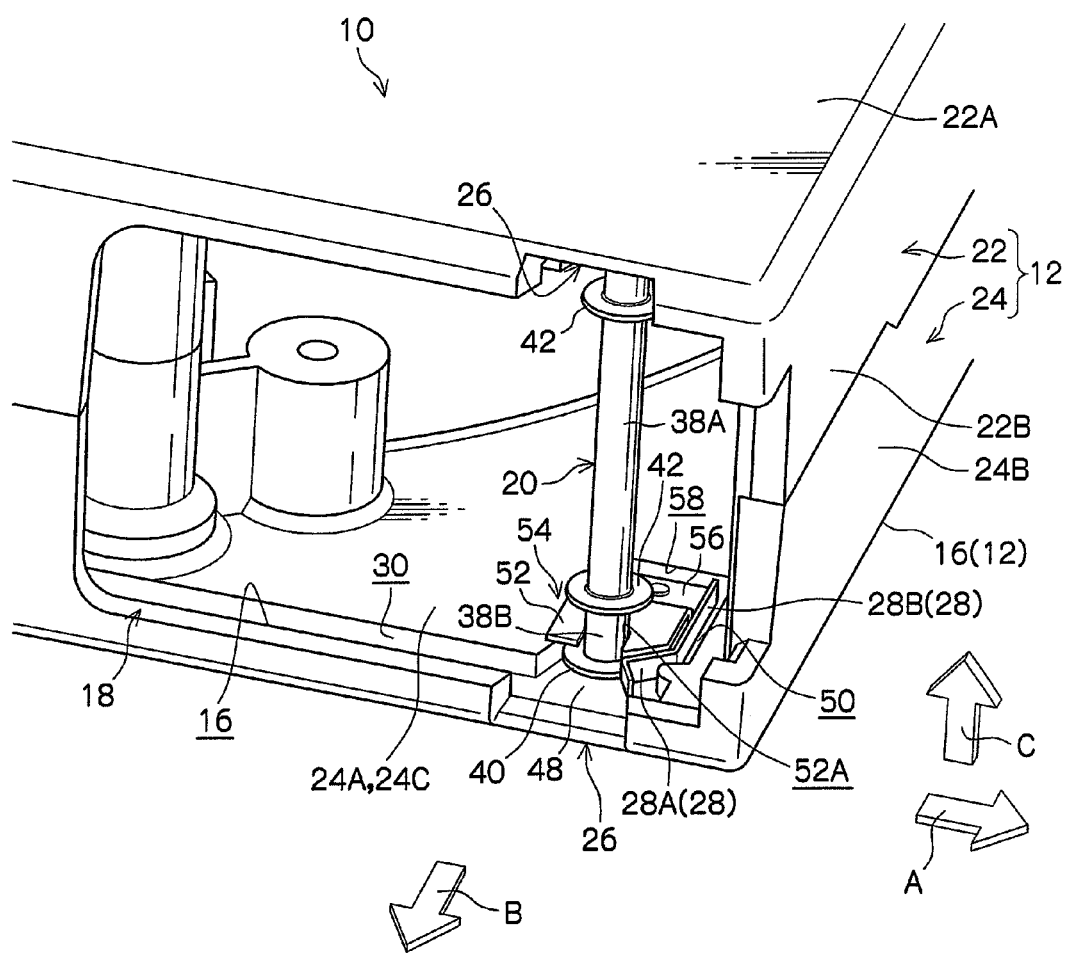
FIG. 6 is a perspective view showing the leader pin of the first embodiment of the recording tape cartridge of the present invention, when the leader pin is held in the case.

Further, as shown in FIG. 6, retaining springs 28 are each provided as retaining spring portions near pin receiving portions 26 of the case 12. Specifically, although described in detail below, each retaining spring 28 has an engagement end 28A which engages with a right front portion of an outer flange 40 of the leader pin 20 (described below), and holds the leader pin 20 with respect to the case 12. The holding state may be released by pulling the leader pin to the right with a force exceeding a predetermined value.

As shown in FIGS. 7 and 8, the door 18 that opens and seals the opening portion 16 has a substantially rectangular shape and can seal the opening portion 16 independently. Upper and lower edge portions of the door 18 are slidably inserted into guide grooves 30 provided at the top plate 22A and the base plate 24A and running along the open surface of the opening portion 16 and the right side wall 12A. The door 18 is guided by the guide grooves 30 and may slide back and forth, and can be selectively positioned between a sealed position that seals the opening portion 16 and an open position that opens the opening portion 16. The door 18 is also biased toward the front by a coil spring 32, which is a biasing member provided between the case 12 and the door 18, and is normally in the closed position due to this biasing force. An operation portion 18A is provided at the front edge of the door 18 and projects out to the right, and by pushing the operation portion 18A to the rear, the door 18 may be moved to the open position in opposition to the biasing force of the coil spring 32.

As shown in FIG. 8, a gear opening portion 34 is provided at the center portion of the base plate 24A of the case 12, and exposes a reel gear (not shown) of the reel 14. A drive device is engaged by the reel gear, a driving gear of the drive device rotates, and the reel 14 is thus driven to rotate within the case 12 without making contact therewith. The case 12 is also provided with guide regulation walls 36 that run along a circumference with substantially the same axis as the gear opening 34, and that partially project from the top plate 22A and the base plate 24A, such that the upper and lower edges thereof meet together. The guide regulation walls 36 prevent the reel 14 from rattling, and also prevent dust and the like from entering into the mounting area of the reel 14 since they are connected at edges thereof to the peripheral walls 22B and 24B.

Structure of the Leader Pin

Figure 5:
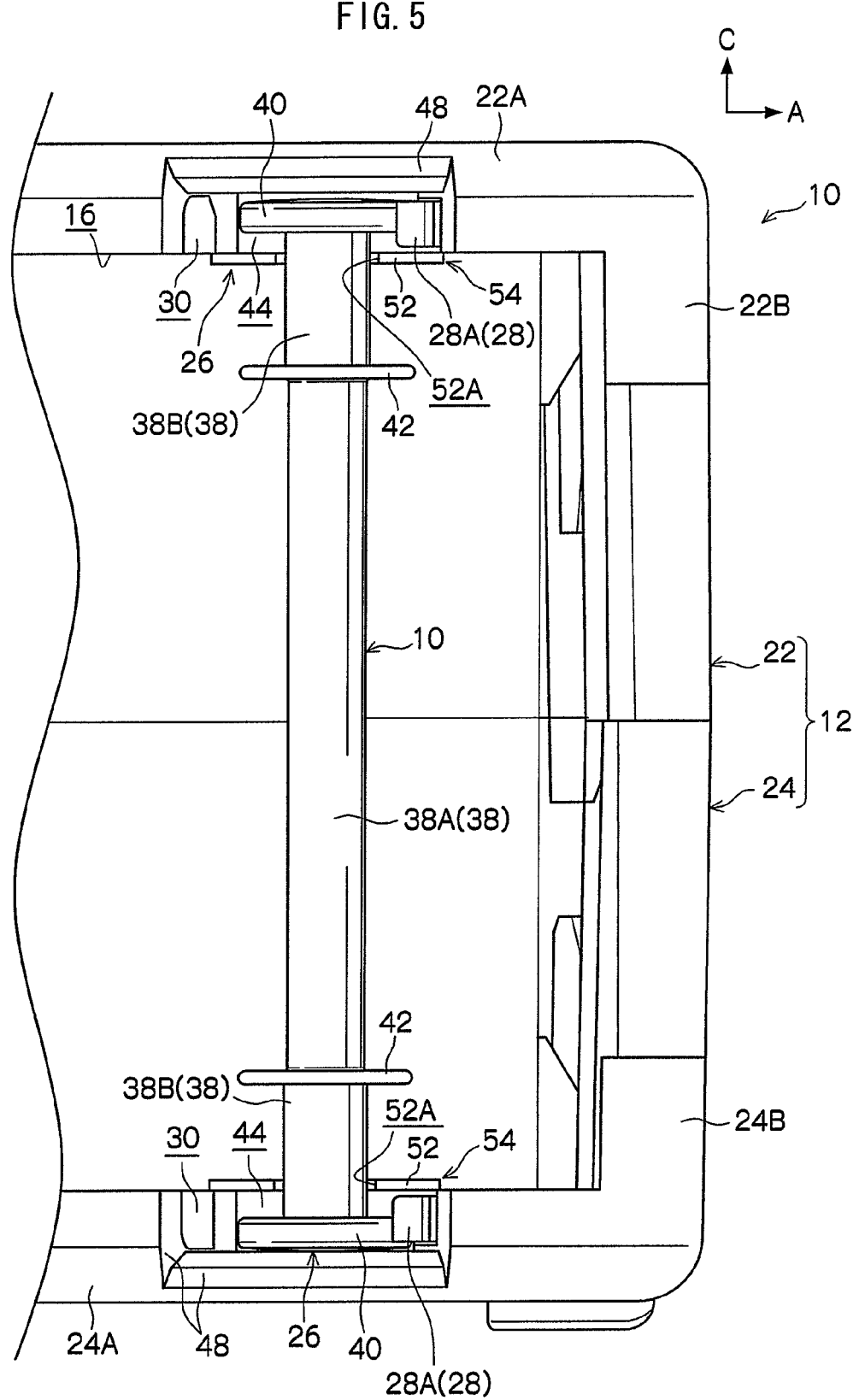
FIG. 5 is a side view showing the leader pin of the first embodiment of the recording tape cartridge of the present invention, when the leader pin is held in the case.

FIG. 5 shows a front view of the leader pin 20 held within the case 12. As may be seen from FIG. 5, the leader pin 20 includes, as main elements thereof, a substantially vertical bar shaped axis portion 38, a pair of upper and lower outer flanges 40 formed as guard portions respectively extending at both length-direction ends of the axis portion, and a pair of upper and lower inner flanges 42 extending at the inner sides of each of the outer flanges 40 of the axis portion 38.

The axis portion 38 is a column having a small diameter. As shown in FIGS. 7 and 8, a length direction thereof corresponds to a width direction of a magnetic tape T (a vertical direction of the recording tape cartridge 10). A portion at an inner side of the pair of upper and lower inner flanges 42 of the axis portion 38 forms a connection portion 38A to which the magnetic tape T connects, and the recording tape T is connected to the end of the magnetic tape T by a clamp member (not shown) having a substantially "C" shape in a sectional view. The portions of the axis portion 38 between the pair of upper and lower outer flanges 40 and the pair of upper and lower inner flanges 42 are hooking portions 38B which are hooked by the withdrawing mechanism of the drive device described above.

Each of the pair of upper and lower outer flanges 40 is a small circular plate that projects toward an outer side in a radial direction of the axis portion 38 direction (a direction that runs along a surface that is perpendicular to the length direction of the axis portion 38). Each edge surface 40A of the outer flange 40 is rounded to form a spherical surface. Each inner flange 42 is a small circular plate that projects toward an outer side in a radial direction of the axis portion 38 (a direction that runs along a surface that is perpendicular to the length direction of the axis portion 38). Each inner flange 42 has substantially the same diameter as the outer flanges 40. The leader pin 20 may be used with a magnetic tape T having a width of approximately 12.65 mm.

The portions of the leader pin described above may be formed as an integrated leader pin from stainless steel (non-magnetic, according to Japanese Industrial Standard SUS303). The method of manufacturing the leader pin 20 is described below.

Leader Pin Holding Structure

As shown in FIGS. 5 and 6, in the leader pin 20 having the above structure, the pair of upper and lower flanges 40 are housed in corresponding pin receiving portions 26 of the case 12, and the leader pin 20 is thereby held with respect to the case 12. The following is a description of the receiving portions 26; however, since they are vertically symmetrical, only one receiving portion will be described (that at the side of the base plate 24A).

Figure 1:
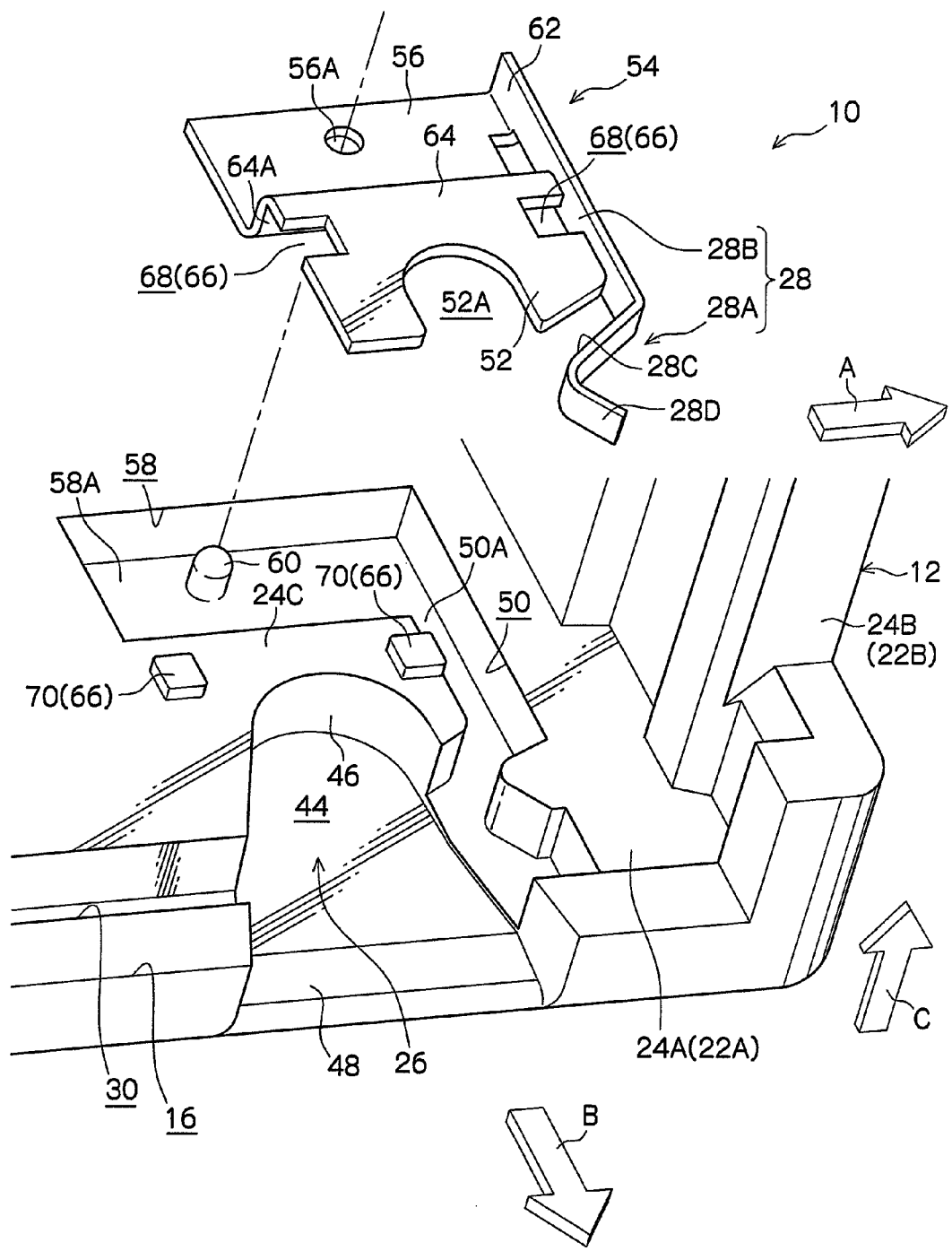
FIG. 1 is an exploded perspective view showing the main portion of a first embodiment of the recording tape cartridge of the present invention.
Figure 2:
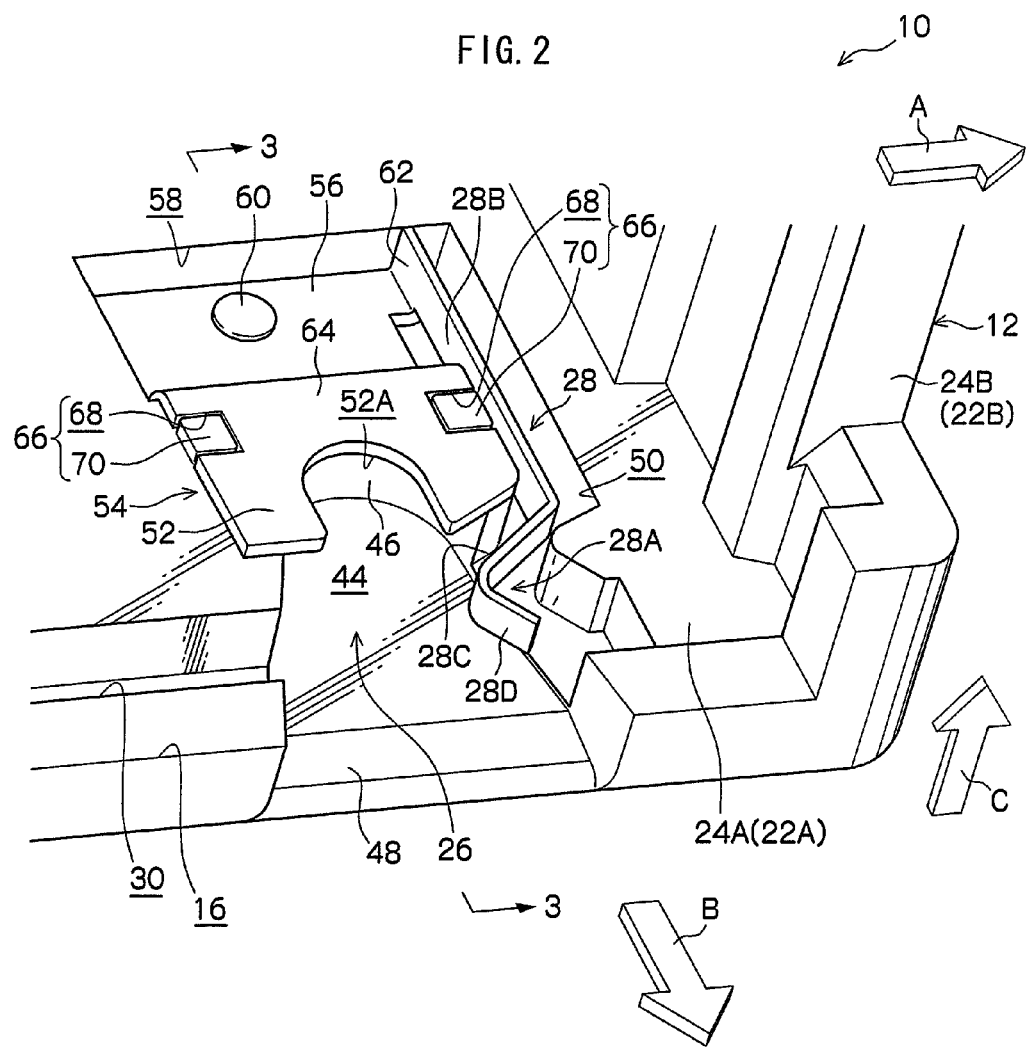
FIG. 2 is a perspective view showing the main portion of the first embodiment of the recording tape cartridge of the present invention.

As shown in FIGS. 1 and 2, a pin receiving portion 26 in the case 12 faces an opening (right) surface of the opening portion 16, and includes a recessed housing portion 44 as a leader pin receiving portion that is open to allow an outer flange 40 to advance and withdraw. Recessed housing portion 44 is formed as a thin portion in the base plate 24A (top plate 22A), such that, in plan view (bottom view), it is surrounded by a wall portion (wall surface) 46 that has a substantially "U" shape and that opens to the right. A recessed guide portion 48 is formed continuously from the open end of recessed housing portion 44, such that it guides the outer flanges of the leader pin 20 from the opening portion 16 to the recessed housing portion 44.

As shown in FIGS. 1 and 2, the recessed guide portion 44 has a taper shape in plan view such that the opening thereof widens gradually from the recessed housing portion 44 to the opening portion 16. Further, a guide groove 30 that guides the door 18, and a spring groove 50 that allows an engagement edge 28A of the retaining spring 28 to advance toward and withdraw from a position where it engages with the outer flange 40 within the recessed housing portion 44, are continuously formed with the recessed guide portion 44.

Figure 3:
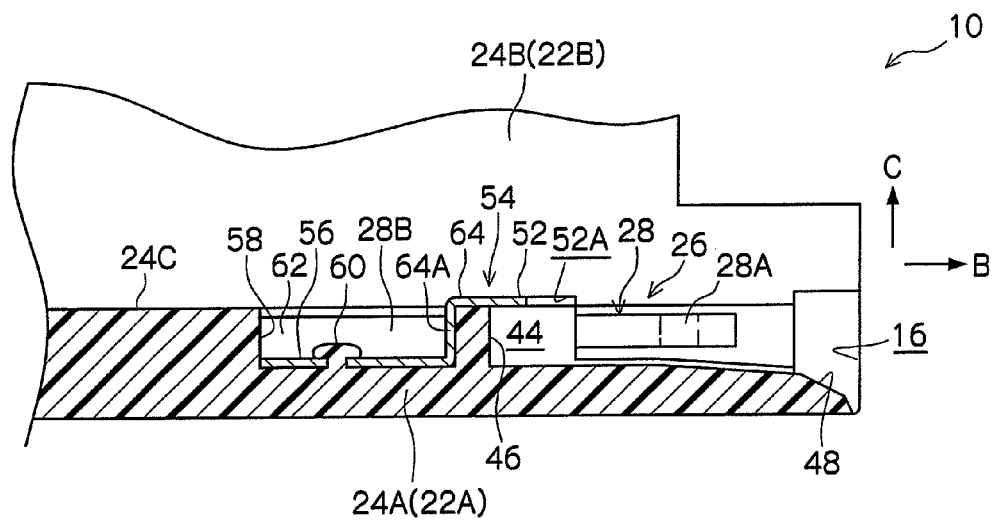
FIG. 3 is a sectional view along line 3-3 of FIG. 2.
Figure 4:
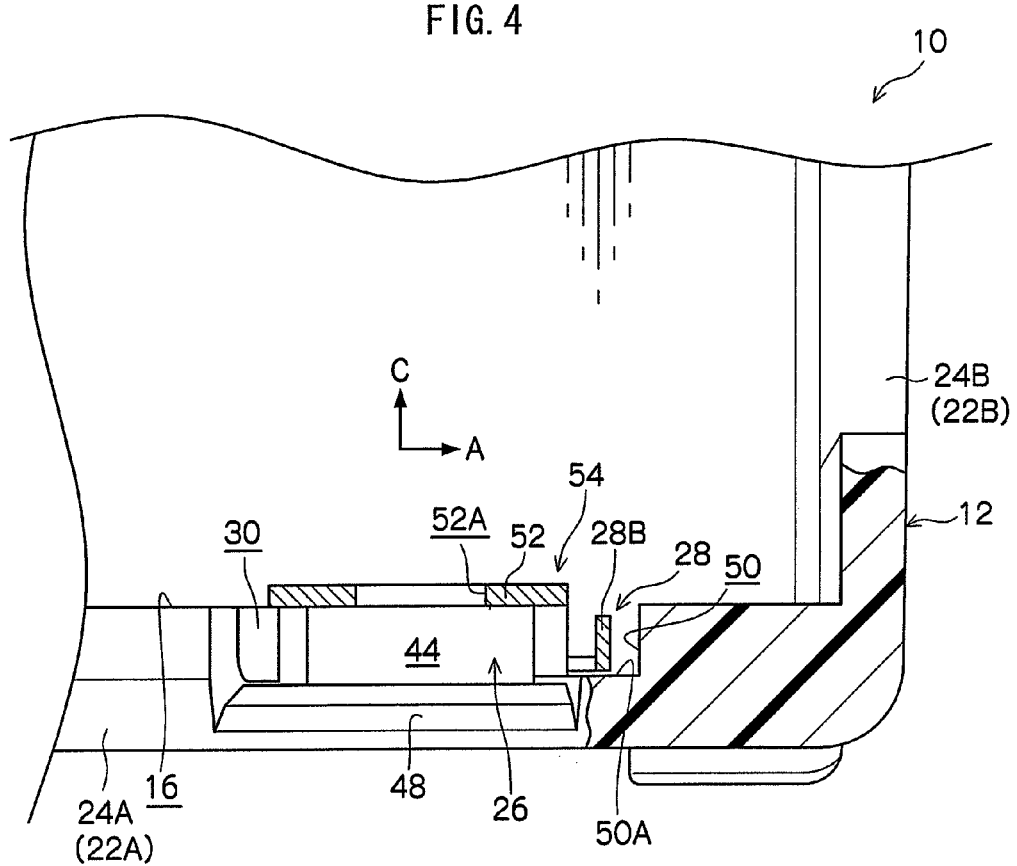
FIG. 4 is a partial cutaway side view showing the main portion of the first embodiment of the recording tape cartridge of the present invention.

As shown in FIGS. 2-4, pin receiving portion 26 includes an overhanging portion 52 that overhangs from an upper (lower) edge portion of wall portion 46 over recessed housing portion 44, and that opposes base plate 24A (top plate 22A). Overhanging portion 52 includes a cutaway portion 52A that has an edge portion having a substantially "U" shaped opening in plan (bottom) view, and that opens towards the opening portion 16. As shown in FIG. 6, cutaway portion 52A allows insertion of the hooking portion 38B of the leader pin 20 when one of the outer flanges 40 is positioned in recessed housing portion 44. As shown in FIGS. 5 and 6, overhanging portions 52 cover the outer flanges 40 inserted into recessed housing portions 44, from a magnetic tape T side (tape connection portion 38A side).

The dimensions of each portion of a single pin receiving portion 26 described above (upper or lower, one side only) are individually determined such that, when one of the outer flanges 40 of the leader pin 20 is inserted into the recessed housing portion 44, the incline of the leader pin 20 in a left and right direction (the direction in which the outer flange 40 at a side not inserted into the recessed housing portion 44 moves with respect to the opening portion 16) is a predetermined angle (for example, 7°) or less, due to the engagement of the outer flange 40 with the overhanging portion 52.

The dimensions of each portion of a single pin receiving portion 26 (upper or lower, one side only) are individually determined such that, when one of the outer flanges 40 of the leader pin 20 is inserted into the recessed housing portion 44, the incline of the leader pin in a front or rear direction (a direction in which the outer flange at a side not inserted into the recessed housing portion 44 moves to the front or rear) is another predetermined angle (for example, 5°) or less, due to the engagement of the outer flange 40 with the wall portion 46. In other words, the pin receiving portion 26 is configured such that the outer flanges 40 and the hooking portions 38B of the leader pin 20 do not interfere with the overhanging portion 52 as a result of the incline of the leader pin 20 in a front or rear direction.

Due to the above, in the recording tape cartridge 10, the leader pin 20 may maintain a standing position relative to the case 12 (that is, it does not incline substantially in any direction), when the outer flanges 40 are inserted into the upper and lower pin-receiving portions 26.

In the recording tape cartridge 10, when the outer flanges 40 are inserted into the recessed housing portions 44, the release thereof from recessed housing portions 44 is controlled by the retaining spring 28 described above. Specifically, retaining spring 28 is provided with a leaf spring 28B disposed within spring groove 50, which extends lengthwise in a left-right direction, and an engagement end 28A formed at the end of the leaf spring 28B. Leaf spring 28B can deform elastically such that the engagement end 28A may oscillate in a front and rear direction.

As shown in FIG. 6, since the engagement end 28A of the retaining spring 28 engages with a right front portion of the outer flange 40 that is within the recessed housing portion 44, the outer flange 40 is held such that it is not (easily) released from the pin receiving portion 26. Thereby, the leader pin 20 is held at a fixed position in the case 12. More specifically, a holding side contact surface 28C of the engagement end 28A contacts with the outer flange 40 that is within the recessed housing portion 44. The holding side contact surface 28C is an inclined surface that inclines with respect to a contact/release direction of the outer flange 40 in relation to the recessed housing portion 44.

Thus, when the leader pin 20 is to be released from the pin receiving portion 26, a force greater than a predetermined value is applied to move the leader pin 20 to the right, and part of this motive force is converted by the holding side contact portion 28C to motive force that moves the engagement end 28A in a front direction, in opposition to the elastic force of the leaf spring 28B. Thereby, the outer flange 40 can be disengaged from the recessed housing portion 44.

As shown in FIGS. 1 and 2, engagement end 28A of retaining spring 28 includes a holding surface 28D which inclines with respect to a contact/release direction of the outer flanges 40 with respect to the recessed housing portion 44 to form a substantially mountain-shaped incline together with the holding side contact portion 28C. Thus, when the leader pin 20 is to be held at the pin retaining portion 26, a force greater than a predetermined amount is applied to move the leader pin 20 to the left, and part of this motive force is converted by the holding surface 28D to motive force that moves the engagement end 28A in a front direction, in opposition to the elastic force of the leaf spring 28B. Thereby, the outer flange 40 can be inserted into the recessed housing portion 44.

As shown in FIGS. 1 and 2, retaining spring 28 and overhanging portion 52 are provided integrally at a leader holding member 54. Leader holding member 54 includes a fixed portion 56 that is fixed to the case 12. In this embodiment, the fixed portion 56 is formed as a substantially rectangular flat plate in plan view. The fixed portion 56 is fixed to the base plate 24 by insertion into a recessed fixing portion 58, which is disposed in the base plate 24 at the left side of the recessed housing portion 44, and which continues from a left side portion of the spring groove 50 (from an inner portion when looking from the opening portion 16). More specifically, as shown in FIG. 1, by inserting a caulking projection 60 that projects from a base surface 58A of recessed fixing portion 58 into a through-hole 56A formed in the fixed portion 56, and caulking the caulking projection 60 (for example, by thermal caulking), fixed portion 56 may be fixed to the case as shown in FIG. 2.

Base surface 58A of recessed fixing portion 58 is substantially the same surface as base surface 50A of spring groove 50. Retaining spring 28 is disposed to project from a front edge of fixed portion 56 towards an upper side (a top plate 22A side or the open side of spring groove 50). More specifically, the left edge of leaf spring 28B of retaining spring 28 is connected to spring connection portion 62 which projects upwards from the front left edge of fixed portion 56.

The leader holding member 54 includes an overhanging portion 52 which is connected to the fixed portion 56 by an overhanging connection portion 64 connected to the right edge portion of the fixed portion 56. Overhanging connection portion 64 includes a step portion 64A (a step shaped wall) formed between fixed portion 56 and connection portion 64, such that it may be placed on the general surface 24C between recessed fixing portion 58 and recessed housing portion 44 (wall portion 46) of base plate 24A. Therefore, in this embodiment, overhanging portion 52 and fixed portion 56 are substantially parallel planes.

Tape recording cartridge 10 includes a position-fixing structure 66 that fixes the position of the leader holding member 54 with respect to the case 12. In the present embodiment, the position-fixing structure 66 includes cutaway fixing portions 68, provided between the fixed portion 56 and the overhanging portion 52 of the leader holding member 54, that is, provided at the overhanging connection portion 64, and also includes fixing projections 70 that project from the general surface 24C of the base plate 24A of the lower case 24. The cutaway fixing portions 68 are a pair of front and rear cutaway portions that open at both sides in a width direction of the overhanging portion 64, said width direction being aligned substantially in a front/rear direction of the case 12. Fixing projections 70 are a pair of front and rear projections corresponding to the cutaway fixing portions 68.

As shown in FIG. 1, since the leader holding member 54 is set into the base plate 24A by fixing projections 70 respectively inserted into cutaway fixing portions 68, the position of the leader holding member 54 with respect to the case is fixed in the front, rear, left and right directions. In the recording tape cartridge 10, in a state in which the position with respect to the case 12 is fixed by the position-fixing structure 66, the caulking projection 60 is inserted into the through-hole 56A of the fixed portion 56 of the leader holding member 54. Therefore, when the position with respect to the case 12 is fixed by the position-fixing structure 66, the leader holding member 54 is fixed to the case by the caulking projection 60.

The leader holding member 54 as described above may be formed of a metal such as stainless steel or the like, and the elements thereof (retaining spring 28, overhanging portion 52, fixed portion 56, spring connection portion 62 and overhanging connection portion 64) may be formed integrally by press-forming or the like.

Next, the first embodiment will be explained.

In the recording tape cartridge 10 having the above structure, when information is recorded to the magnetic tape T, or when information recorded to the magnetic tape T is to be played back, the tape cartridge 10 is loaded to a drive device, and together with this loading action, an operation portion 18A is pushed by the drive device and door 18 moves, thus opening the opening portion 16. As a mechanism for withdrawing the tape from the opening portion 16 after insertion thereof into the case 12, the magnetic tape T is pulled out of the case 12, due to the hooking portion 38B of the leader pin 20 being hooked and pulled and, thereby, the leading end of the magnetic tape T may be guided to a machine reel. Subsequently, the magnetic tape T is taken up and wound around the machine reel and drawn out of the case 12, and information is written, or recorded information is read, by a recording/playback head arranged at a predetermined position on a tape path. After the magnetic tape T has been used, it is taken up by the reel 14 and returned to its original state, and each of the outer flanges 40 of the leader pin 20 are inserted into corresponding recessed housing portions 44 of pin receiving portions 26, and are thus held with respect to the case 12.

Thereby, in the recording tape cartridge 10, since overhanging portions 52 are provided at each of the pin receiving portions 26, even if the recording tape cartridge receives a shock due to, for example, being dropped, tilting or separation of the leader pin 20 with respect to the case 12 may be prevented. In addition to the effect that the tilting of the leader pin in any direction is restricted by the engagement of the wall portion 46 to the outer flange 40, a dilative deformation of the case 12 near the opening portion 16, at which the upper case 22 and lower case 24 are not connected, may also be prevented due to the outer flanges 40 engaging with the overhanging portions 52. In other words, dilative deformation of the case 12 which causes tilting or separation of the leader pin 20 with respect to the case 12 may be prevented by the leader pin 20 itself.

Due to the above, even after the recording tape cartridge 10 has sustained a shock due to being dropped, the position of the leader pin 20 may be accurately maintained with respect to the case 12, thus ensuring a function in which the leader pin 20 may be dependably and accurately pulled out by the withdrawal mechanism of the drive device.

In the recording tape cartridge 10, since the overhanging portion 52 is provided at the leader holding member 54, which is formed separately from the case 12 and fixed thereto, it is possible to avoid providing the overhanging portion 52 as a thin resin portion of the case 12. In this embodiment, since the leader holding member 54 which includes the overhanging portion 52 is formed of metal, it is possible to obtain an overhanging portion 52 which is thin (thus ensuring running space in a width direction (up and down direction) of the magnetic tape) and also has sufficient strength to resist dilation. Moreover, in the recording tape cartridge 10, since a fixed region of the fixing member 56, which is fixed by the caulking projection 60, may be disposed near the overhanging portion 52, it is possible to reduce the amount of elastic deformation of the overhanging portion 52 (overhanging connection portion 64) for preventing the dilation described above.

Further, since in the leader holding member 54 the overhanging portion 52 and the retaining spring 28 are provided integrally, the relative positional accuracy between the overhanging portion 52 and the retaining spring 28 may be controlled in terms of the accuracy of the dimensions of the leader holding member 54 and, thus, the relative positional accuracy of the overhanging portion 52 and the retaining spring 28 is high. As a result, in the recording tape cartridge 10, each portion that forms each pin receiving portion 26 can be disposed accurately with respect to the recessed housing portion 44.

In the recording tape cartridge 10, since the position of the leader holding member 54 is fixed by the position-fixing structure 66 so as to be near to the wall portion 46 (which is a base point for the position of the outer flanges 40 with respect to the case 12) with respect to the recessed housing portion 44, the positional accuracy of the overhanging portion 52 with respect to the wall portion 46 (recessed housing portion 44) is high. Further, together with the increase in positional accuracy of the overhanging portion 52 with respect to the wall portion 46, the positional accuracy of the retaining spring 28 (engagement edge 28A) with respect to the wall portion 46 is also increased.

In the recording tape cartridge 10, since the overhanging portion 52 and the retaining spring 28 share the fixing portion 56, compared to a structure in which they are individually fixed to the case 12, the space within the case 12 may be more effectively used, and the overhanging portion 52 and the retaining spring 28 may be provided as a separate body to the case 12. That is, it is possible to provide the overhanging portion 52 while suppressing a loss of space within the case 12. This effect also enables the outer flanges 40 of the leader pin 20 to be processed thinly (enables the establishment of a process technique for a load-bearing structure in which outer flanges 40 and inner flanges 42 are made to have the same diameter at the time of processing).

Other Embodiments

Next, other embodiments of the present invention will be described. Further, parts and portions substantially the same as those described in the above embodiment or structure are given the same reference numbers as those in the above embodiment or structure, and explanations thereof may be omitted, and they may not be shown in the drawings.

Second Embodiment

Figure 9:
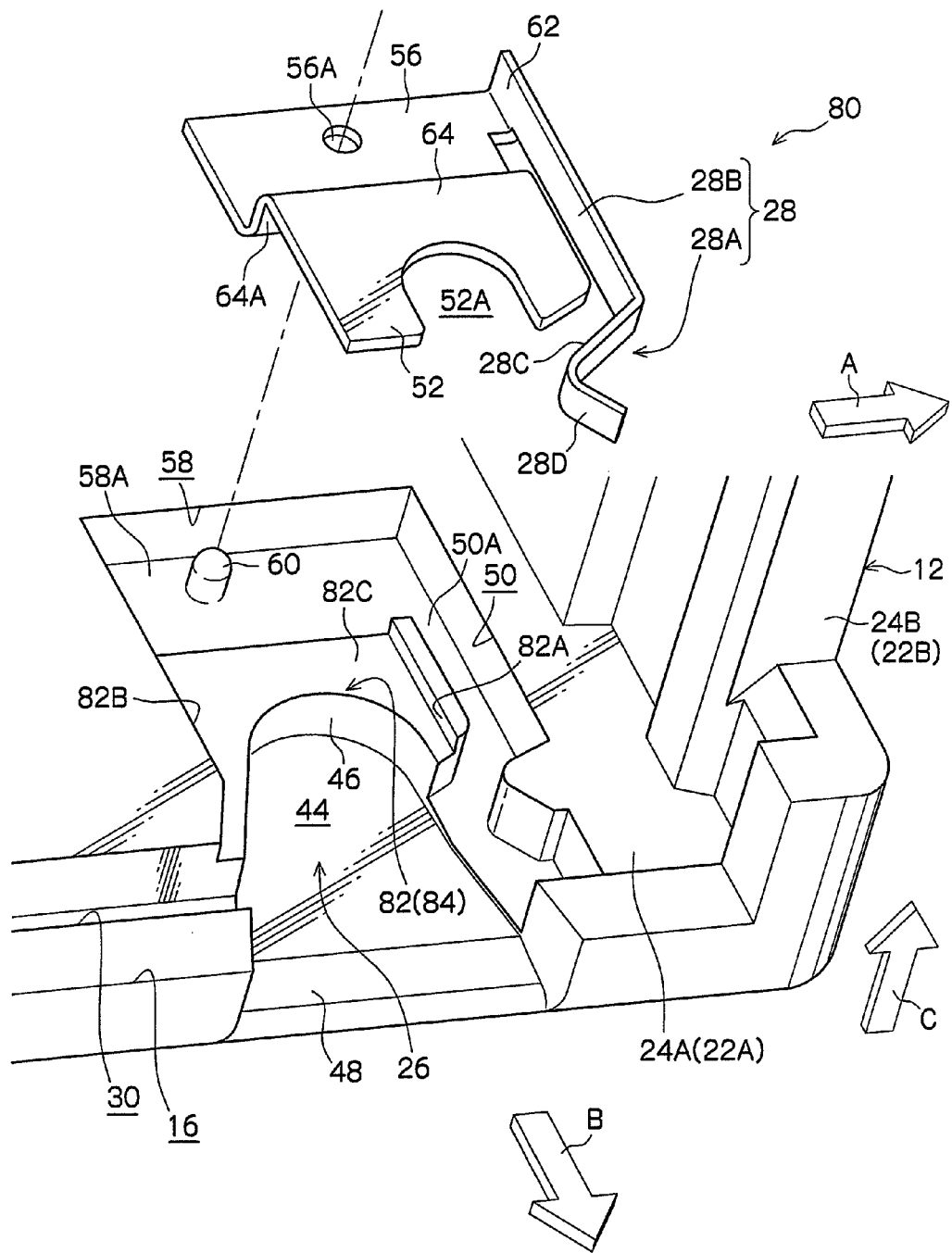
FIG. 9 is an exploded perspective view showing the main portion of a second embodiment of the recording tape cartridge of the present invention.
Figure 10:
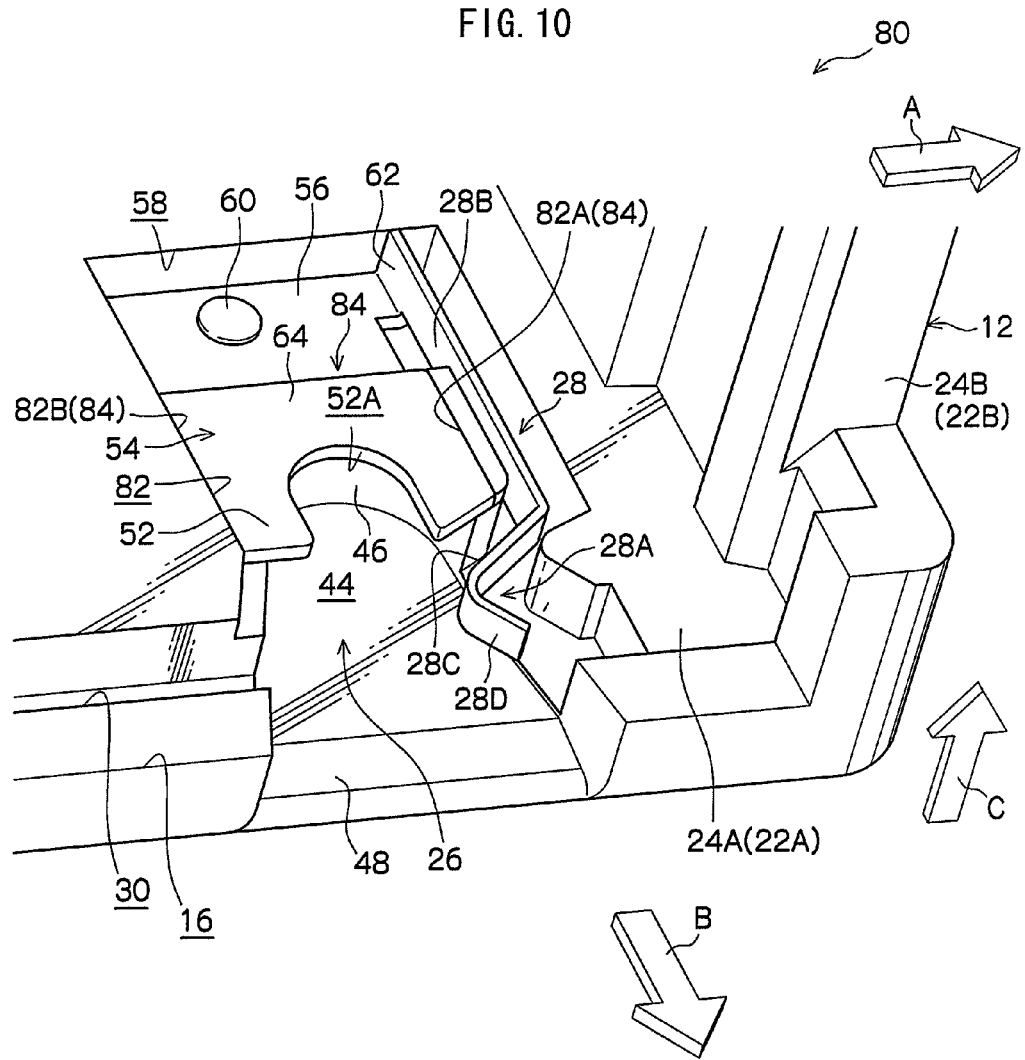
FIG. 10 is a perspective view showing the main portion of the second embodiment of the recording tape cartridge of the present invention.

FIG. 9 shows an exploded perspective view of the leader pin receiving portions 26 of a recording tape cartridge 80 according to a second embodiment of the invention, and FIG. 10 shows a perspective view of the pin receiving portions 26 of the recording tape cartridge 80. As shown in these drawings, the recording tape cartridge 80 differs from the tape cartridge 10 according to the first embodiment in that, instead of the overhanging portion 52 (overhanging connection portion 64) being disposed on the general surface 24C of the lower case 24, the overhanging portion 52 is inserted in recessed position-fixing portion 82 of the lower case 24.

As shown in FIG. 9, recessed position-fixing portion 82, which forms part of the position-fixing portion 84 of the recording tape cartridge 80, is formed between recessed housing portion 44 and recessed fixing portion 58, and is recessed with respect to the general surface 24C of the lower case 24 only to the extent of the thickness of the overhanging portion 52. The front and rear ends of the recessed position-fixing portion 82 are respectively delimited by position-fixing walls 82A and 82B. When the overhanging portion 52 is inserted into the recessed position-fixing portion 82 and placed on the base surface 82C, the position of the leader holding member 54 in a front/rear direction is fixed due to the position-fixing walls 82A and 82B at both width direction ends of the overhanging portion 52. In the present embodiment, the positions of the leader holding member 54 in the front/rear direction may be fixed by the fixed portion 56 (step portion 64A of overhanging connection portion 64) and the recessed fixing portion 58.

Further, in the recording tape cartridge 80, in comparison with the recording tape cartridge 10, the step portion 64A of the overhanging connection portion 64 is formed so as to be smaller by an amount corresponding to a thickness of the overhanging portion 52. The pin receiving portion 26 on the upper case 22 side is formed to be symmetrical with the above-described pin receiving portion 26 on the lower case 24 side. The other structures of the recording tape cartridge 80, including parts not shown in the drawings, are the same as the corresponding structures of the recording tape cartridge 10.

Therefore, in the recording tape cartridge 80 according to the second embodiment, similar effects to those of the recording tape cartridge 10 of the first embodiment may be obtained by similar mechanisms.

Third Embodiment

Figure 11:
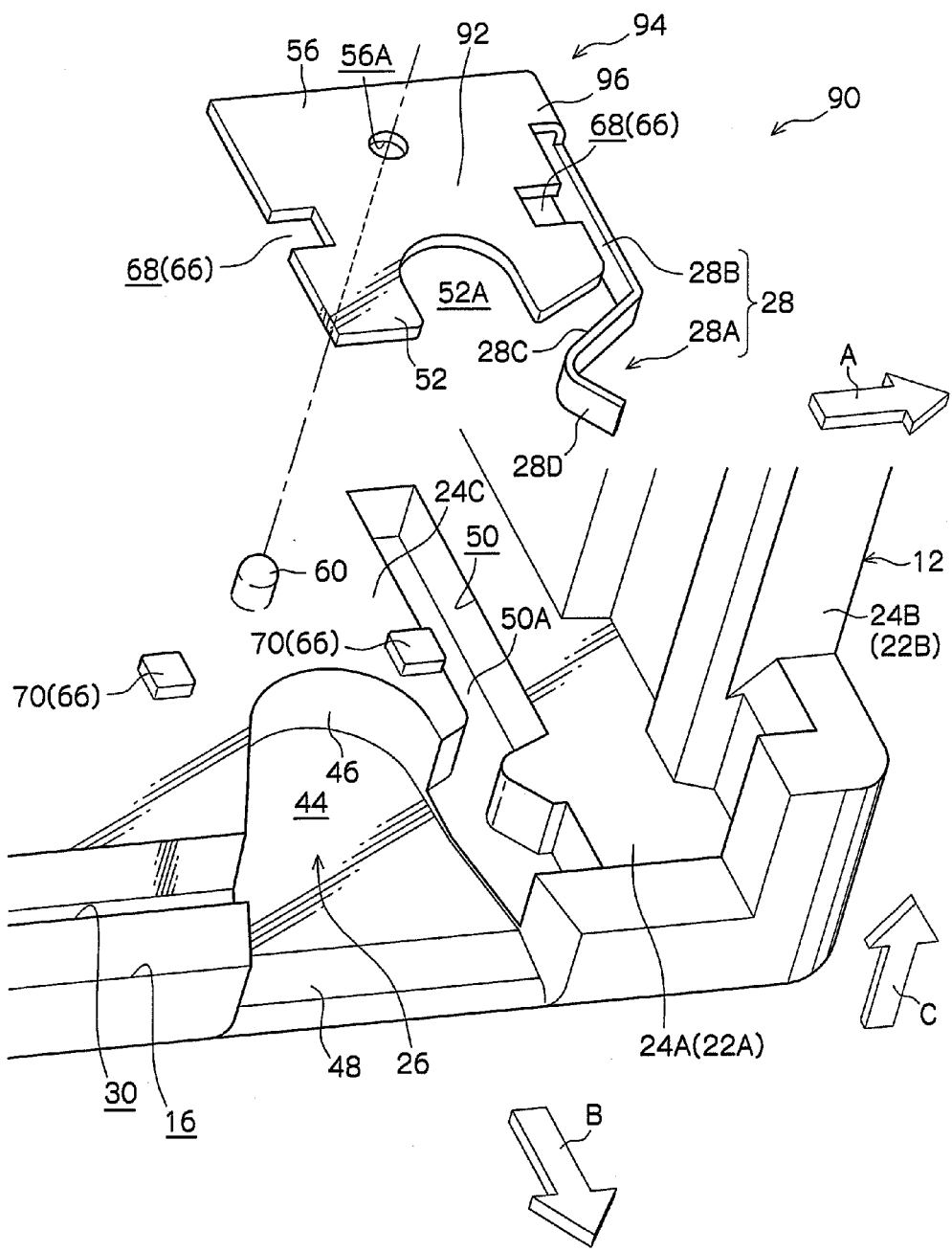
FIG. 11 is an exploded perspective view showing the main portion of a third embodiment of the recording tape cartridge of the present invention.
Figure 12:
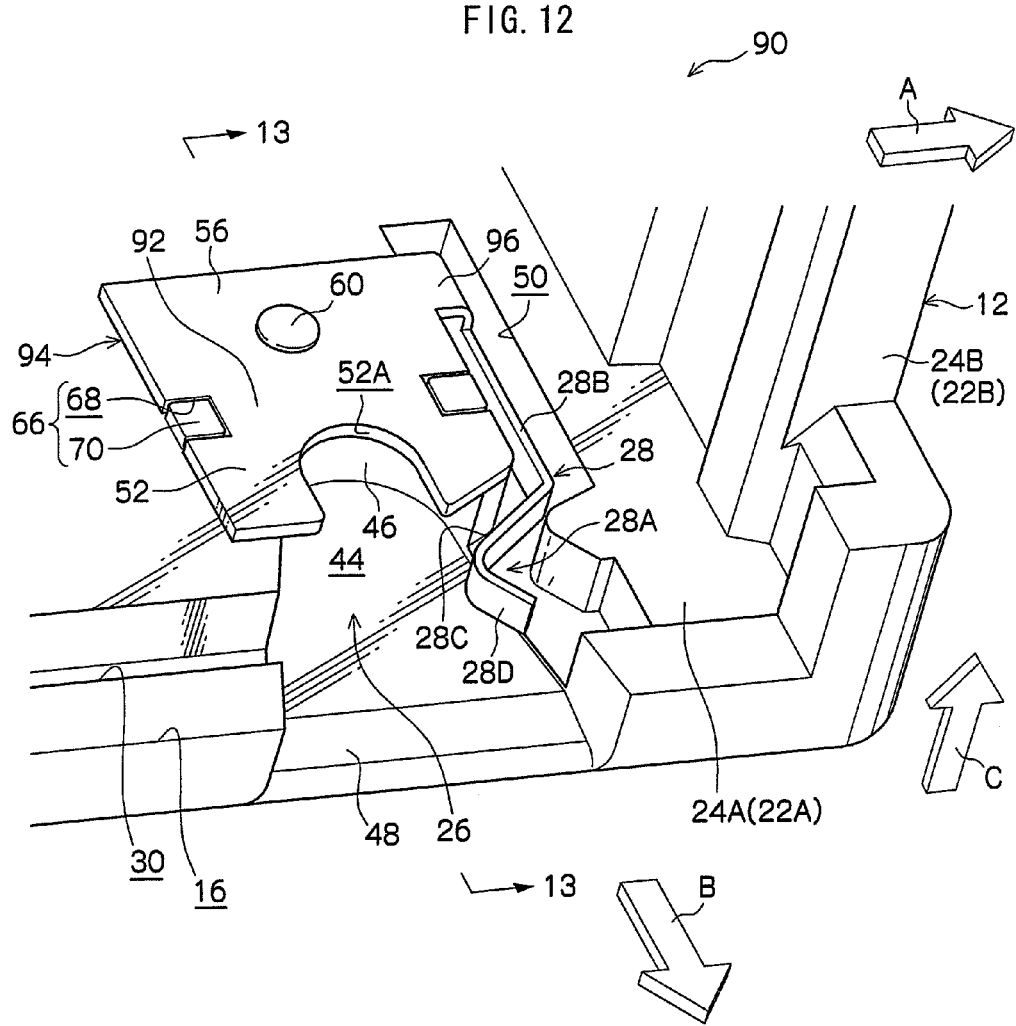
FIG. 12 is a perspective view showing the main portion of the third embodiment of the recording tape cartridge of the present invention.
Figure 13:
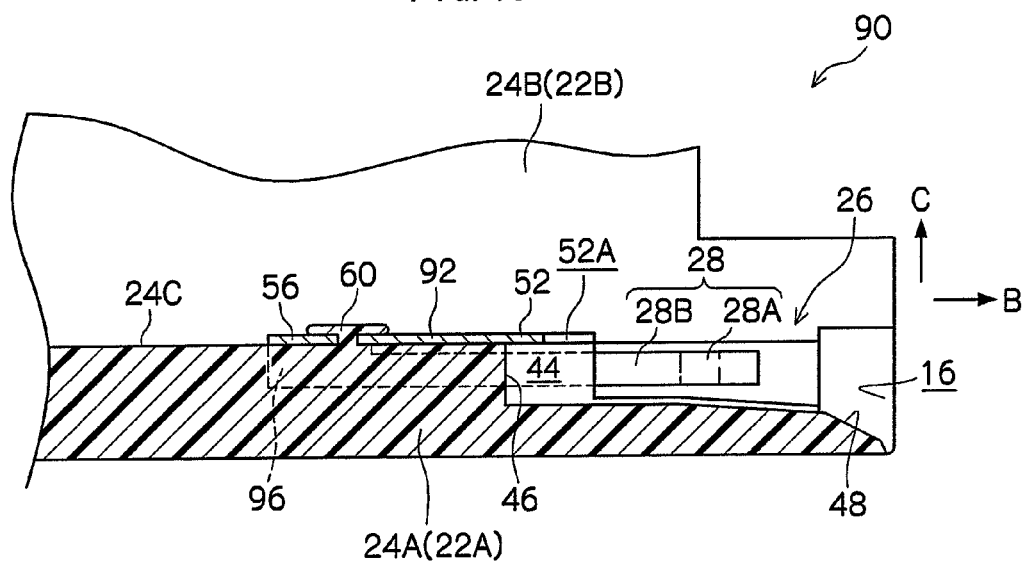
FIG. 13 is a sectional view along line 13-13 of FIG. 12.

FIG. 11 shows an exploded perspective view of the pin receiving portions 26 that form part of the recording tape cartridge 90 according to the third embodiment of the present invention, and FIG. 12 shows a perspective view of the pin receiving portions 26 of the recording tape cartridge 90. FIG. 13 shows a sectional view along line 13-13 of the pin receiving portion 26 of the recording tape cartridge 90. As is shown in these drawings, the recording tape cartridge 90 differs from the recording tape cartridge 10 of the first embodiment in that, instead of a leader holding member 54 in which the overhanging portion 52 and the fixed portion 56 are connected via the overhanging connection portion 64 which includes step portion 64A, the recording tape cartridge 90 is provided with a leader holding member 94 in which the overhanging portion 52 and the fixed portion 56 are connected via a flat plate-shaped overhanging connection portion 92.

As shown in FIGS. 11 through 13, fixed portion 56, overhanging connection portion 92 and overhanging portion 52 are all formed substantially as a flat plate. At the overhanging connection portion 92 is formed a pair of position-fixing cutaway portions 68 forming part of a position-fixing structure 66. The fixed portion 56 is placed on the general surface 24C of the lower case 24 in a state in which the position thereof is fixed by the position-fixing structure 66, and, as shown in FIG. 12, is fixed to the case 12 due to the caulking of the caulking projection 60, which projects from the general surface 24C of the lower case 24.

In the recording tape cartridge 80, in which recessed fixing portion 58 is not provided to the base plate 24A, the left end of leaf spring 28B of retaining spring 28 is connected to spring connection portion 96 which extends down from the front left edge of fixed portion 56. As a result, the retaining spring 28, which is connected to the fixed portion 56 fixed at the general surface 24C of the lower case 24, may be accurately positioned in the spring groove 50. The pin receiving portion 26 at the upper case 22 side is vertically symmetrical to pin receiving portion 26 at the lower case 24 side. The other structures of the recording tape cartridge 90, including those not shown in the drawings, are the same as the corresponding structures of recording tape cartridge 10.

Therefore, in the recording tape cartridge 90 according to the third embodiment, similar effects to those of the recording tape cartridge 10 of the first embodiment may be obtained by similar mechanisms. Further, in the recording tape cartridge 90, as shown in FIG. 13, a recessed fixing portion 58, that is, a thin portion, is not formed in the top plate 22A or the base plate 24A, and the position of a leader holding member 94 that integrates the overhanging portion 52, the retaining spring 28 and the fixed portion 56 may be fixed. That is, in the recording tape cartridge 90, the strength of the case 12 may be higher than that of the recording tape cartridge 10. Consequently, the mounting strength and mounting rigidity of the overhanging connection portion 92 (overhanging portion 52) with respect to the case 12 is increased, and the strength of dilation resistance of the case 12 is also increased.

Fourth Embodiment

Figure 14:
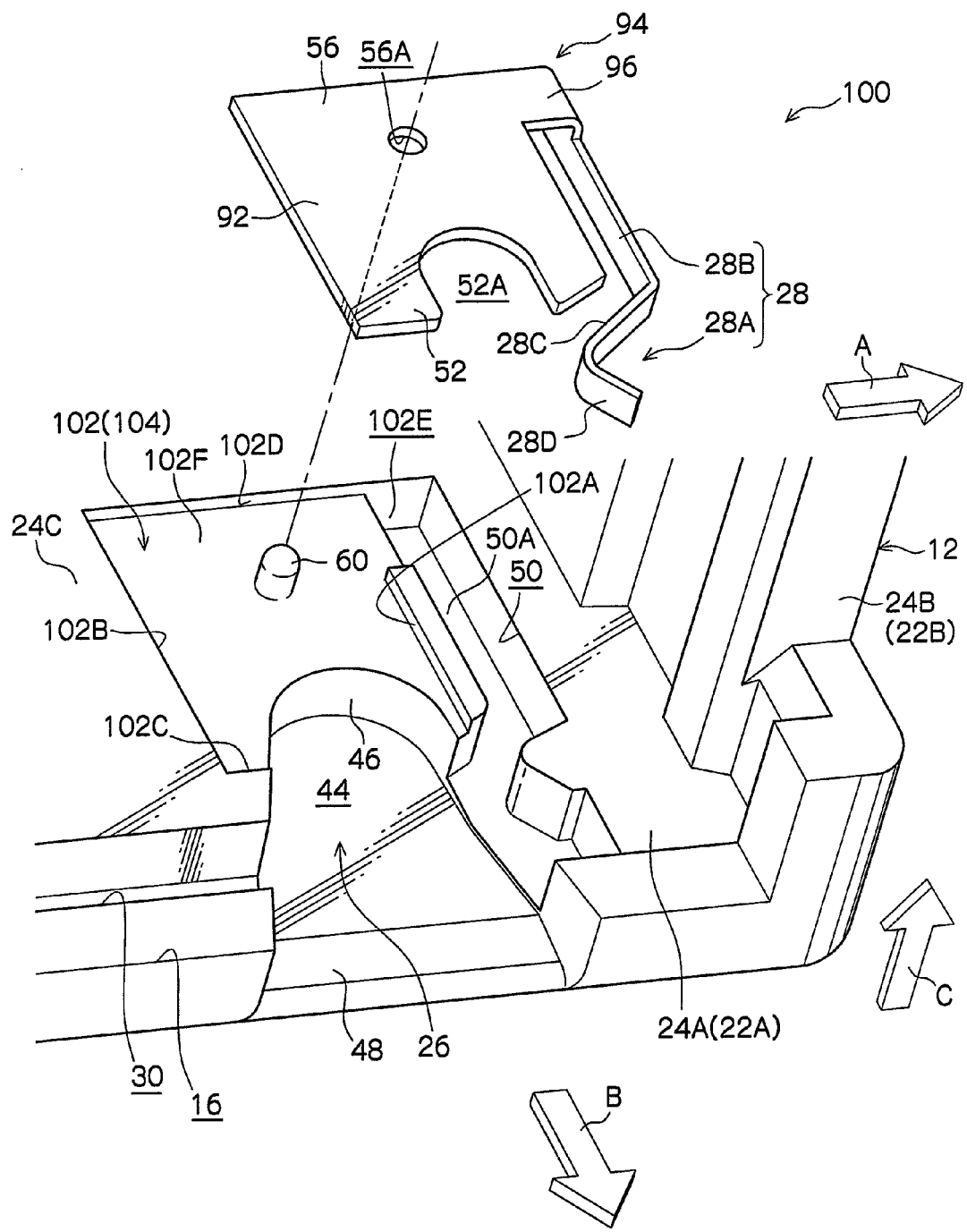
FIG. 14 is an exploded perspective view showing the main portion of a fourth embodiment of the recording tape cartridge of the present invention.
Figure 15:
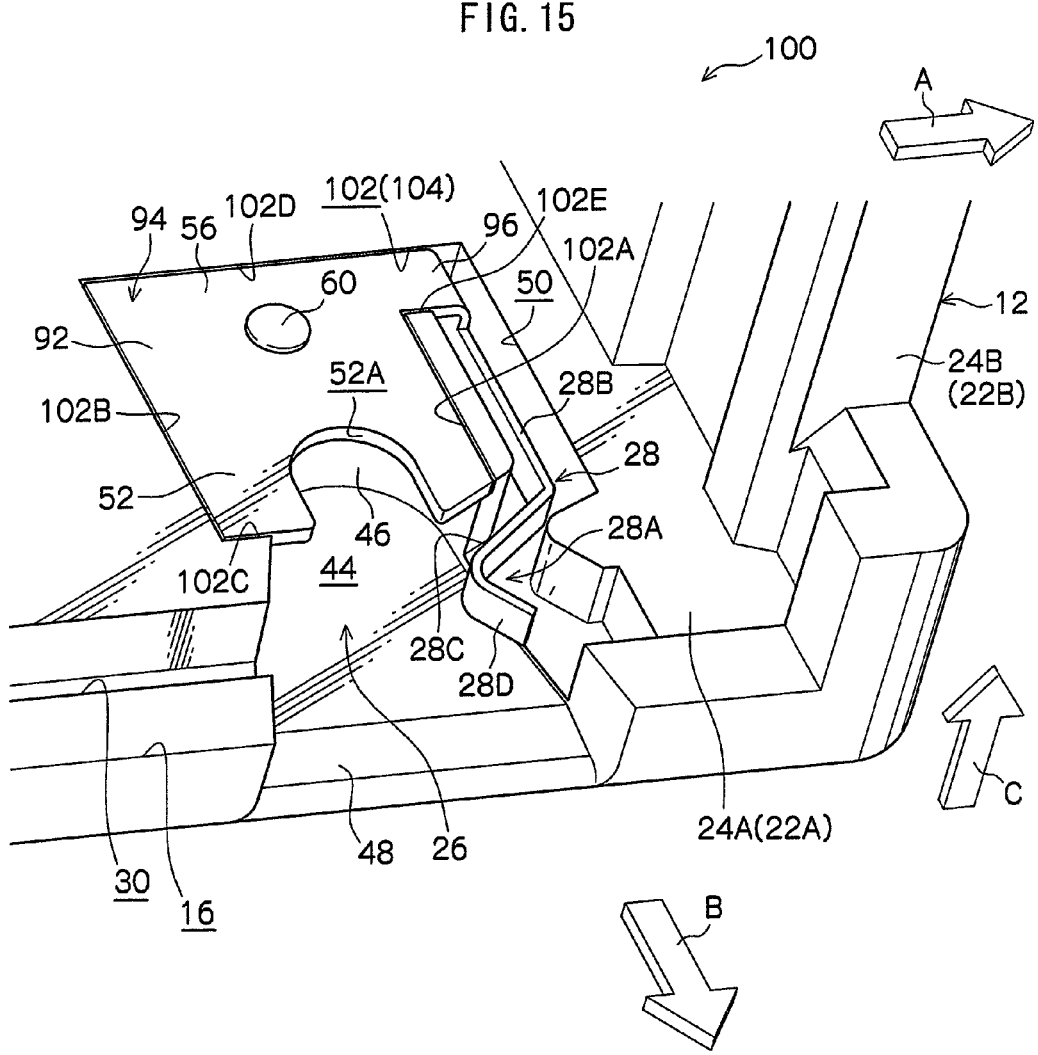
FIG. 15 is a perspective view showing the main portion of the recording tape cartridge of the fourth embodiment of the present invention.

FIG. 14 is an exploded perspective view of the pin receiving portions 26 that form part of the recording tape cartridge 100 according to the fourth embodiment of the present invention, and FIG. 15 is a perspective view of the pin receiving portions 26 that form part of the recording tape cartridge 100. As shown in these figures, recording tape cartridge 100 differs from recording tape cartridge 90 according to the third embodiment in that, instead of overhanging portion 52, overhanging connection portion 92 and fixed portion 56 being placed on the general surface 24C of the lower case 24, overhanging portion 52, overhanging connection portion 92 and fixed portion 56 are inserted into position-fixing recessed portion 102 of the lower case 24.

As shown in FIG. 14, position-fixing recessed portion 102 that forms part of position-fixing structure 104 of the recording tape cartridge 100, is a recessed portion at the left side of housing portion 44 (an inner side when looking from the opening portion 16) that is inset with respect to the general surface 24C of the lower case 24 only to the extent of the plate thickness of the overhanging portion 52. The front and rear edges of position-fixing recessed portion 102 are respectively limited by position-fixing walls 102A and 102B, and the left and right edges of position-fixing recessed portion 102 are respectively limited by position-fixing walls 102C and 102D.

Position-fixing wall 102A includes a cutaway portion 102E to connect position-fixing recessed portion 102 with the spring groove 50.

Since overhanging portion 52, overhanging connection portion 92 and fixed portion 56 of the leader holding member 94 are inserted into position-fixing recessed portion 102, their front and rear positions are fixed by position-fixing walls 102A and 102B at both edges in a width direction thereof, and by position-fixing walls 102C and 102D at the left and right edges thereof. As shown in FIG. 15, when the leader holding member 94 is thus fixed in position, the spring connection portion 96 continues through to cutaway portion 102E, and the overhanging portion 52, the overhanging connection portion 92 and the fixed portion 56 are disposed on the lower surface 102F of the position-fixing recessed portion 102. Further, in this state, due to caulking of the caulking projection 60 which projects from the lower surface 102F of the position-fixing recessed portion 102 and is inserted into the through-hole 56A, the leader holding member 94 is fixed to the case 12.

In the recording tape cartridge 100, in comparison with the recording tape cartridge 90, the protrusion height of the overhanging connection portion 92 is set to be smaller with respect to the fixed portion 56 of the retaining spring 28, by an amount corresponding to a thickness of the overhanging portion 52 or the like. The pin receiving portion 26 at the upper case 22 side is vertically symmetrical to pin receiving portion 26 at the lower case 24 side. The other structures of the recording tape cartridge 100, including those not shown in the drawings, are the same as the corresponding structures of recording tape cartridge 90 (recording tape cartridge 10).

Therefore, in the recording tape cartridge 100 according to the fourth embodiment, similar effects to those of the recording tape cartridge 90 of the third embodiment may be obtained by similar mechanisms.

Although the third and fourth embodiments show examples in which the fixed portion 56, the overhanging connection portion 92 and the overhanging portion 52 form a flat plate, the present invention is not limited thereto, and may, for example, include a structure whereby the retaining spring 28 is disposed so as to stand vertically at the opposite side to the magnetic tape T with respect to the fixed portion 56, and whereby there is an overhanging connection portion in which overhanging portion 52 and the fixed portion 56 form a step portion. Further, overhanging portion 52 and fixed portion 56 are not limited to being connected by the overhanging connection portion, and may be considered to be directly connected.

Although the above embodiments show examples in which the leader holding members 54 and 94 have their positions fixed in the case 12 by the position-fixing structures 66, 84 and 104, the present invention is not limited thereto, and various other position-fixing structures may be adopted.

Although the above embodiments show examples in which the fixed portion 56 is fixed to the case by the caulking of the caulking projection 60, the present invention is not limited thereto, and may include a structure in which the leader holding member 54 includes a fixed portion fixed to the case 12 by screw fastening or snap fits, instead of the fixed portion 56. Further, a structure that combines a fixing structure with respect to the case 12 with a position-fixing structure with respect to the case 12 may also be adopted.

Although the above embodiments show examples in which a flat plate-shaped door 18 is provided to open and close an opening portion 16, which opens to the right, that is, opens in a direction substantially perpendicular to an insertion direction of the case 12 into the drive device, the present invention is not limited thereto, and the case 12 may include the opening portion 16 and door 18 with any arrangement and any shape.

What is claimed is:

1. A recording tape cartridge, comprising:
a reel around which a recording tape is wound;
a case rotatably housing the reel, and including an opening from which the recording tape may be drawn out;
a leader member including a tape connection portion which is connected to the recording tape directly or via a leader tape, and a pair of guard portions respectively provided at portions of the tape connection portion that respectively project further toward width direction outer sides than both width direction edges of the recording tape;
a pair of leader receiving portions formed in the case and facing the opening, that respectively receive the corresponding guard portions of the leader member such that the guard portions may be detached towards the opening side; and
a pair of leader holding members, each provided integrally with a fixed portion fixed inside the case, a retaining spring portion that engages one of the guard portions from the opening side when the one of the guard portions is received by one of the leader receiving portions, and an overhanging portion that overhangs, from a recording tape side, the one of the guard portions which has been received by the one of the leader receiving portions,
wherein each of the fixed portion, the retaining spring portion, and the overhanging portion is integrally formed with a same member; and
wherein the recording tape cartridge further comprises position-fixing structures that fix at least one of the overhanging portions of the pair of leader holding members, and portions between the overhanging portions and the fixed portions, with respect to the leader receiving portions.

2. The recording tape cartridge of claim 1, wherein:
the leader receiving portions are recessed portions formed in the case;
the retaining spring portions of the pair of leader holding members are respectively formed to stand vertically at the recording tape side with respect to the respective fixed portions; and
the case is provided with a pair of spring grooves that respectively communicate with the corresponding leader receiving portions and that accommodate the respective retaining spring portions, and a pair of recessed fixing portions that respectively communicate with the corresponding spring grooves and accommodate the respective fixed portions.

3. The recording tape cartridge of claim 1, wherein:
the leader receiving portions are recessed portions formed in the case;
the retaining spring portions of the pair of leader holding members are respectively formed to stand vertically at a side opposite to the recording tape side with respect to the respective fixed portions; and
the case is provided with a pair of spring grooves that respectively communicate with the corresponding leader receiving portions and that accommodate the respective retaining spring portions.

4. The recording tape cartridge of claim 1, wherein each of the pair of leader holding members is made of metal.

5. The recording tape cartridge of claim 1, wherein a cutaway portion that receives a portion between the tape connection portion of the leader member and one of the pair of guard portions, and that limits the inclination of the leader member, is formed in each of the overhanging portions.

6. The recording tape cartridge of claim 1, wherein the fixed portion and the overhanging portion are formed in the same plane.

7. The recording tape cartridge of claim 1, wherein the fixed portion and the overhanging portion are substantially parallel and include a step portion therebetween.

8. The recording tape cartridge of claim 1, wherein the position-fixing structures include a support surface which forms part of an inner surface of the case, and above which is placed a surface that continues from the overhanging portion to the corresponding fixed portion of at least one of the pair of leader holding members, and that constitutes the same surface as a surface of the overhanging portion.

9. The recording tape cartridge of claim 1, wherein the position-fixing structures include:
 a projection that is formed on a support surface which forms part of an inner surface of the case, and above which is placed a surface that continues from the overhanging portion to the corresponding fixed portion of at least one of the pair of leader holding members, and that constitutes the same surface as a surface of the overhanging portion; and
 a cutaway portion that is formed at the same surface as the overhanging portion, and that continues from the overhanging portion towards the fixed portion of at least one of the pair of leader holding members, and into which the projection is inserted.

10. A recording tape cartridge, comprising:
 a reel around which a recording tape is wound;
 a case rotatably housing the reel, and including an opening from which the recording tape may be drawn out;
 a leader member including a tape connection portion which is connected to the recording tape directly or via a leader tape, and a pair of guard portions respectively provided at portions of the tape connection portion that project further toward width direction outer sides than both width direction edges of the recording tape;
 a pair of leader receiving portions formed in the case and facing the opening, that respectively receive the corresponding guard portions of the leader member such that the guard portions may be detached towards the opening side; and
 a pair of leader holding members, each provided integrally with a fixed portion fixed inside the case, a retaining spring portion that engages one of the guard portions from the opening side when the one of the guard portions is received by one of the leader receiving portions, and an overhanging portion including a cutaway portion that receives a portion between the tape connection portion of the leader member and one of the pair of guard portions, and that limits the inclination of the leader member,
 wherein each of the fixed portion, the retaining spring portion, and the overhanging portion is integrally formed with a same member; and
 wherein the recording tape cartridge further includes position-fixing structures that fix the at least one of the overhanging portions of the leader holding members, and portions between the overhanging portions and fixed portions, in relation to the leader receiving portions.

11. The recording tape cartridge of claim 10, wherein:
 the leader receiving portions are recessed portions formed in the case;
 the retaining spring portions of the pair of leader holding members are respectively formed to stand vertically at the recording tape side with respect to the respective fixed portions;
 the case is provided with a pair of spring grooves that respectively communicate with the corresponding leader receiving portions and that accommodate the respective retaining spring portions, and a pair of recessed fixing portions that respectively communicate with the corresponding spring grooves and accommodate the respective fixed portions.

12. The recording tape cartridge of claim 10, wherein:
 the leader receiving portions are recessed portions formed in the case;
 the retaining spring portions of the pair of leader holding members are respectively formed to stand vertically at a side opposite to the recording tape side with respect to the respective fixed portions; and
 the case is provided with a pair of spring grooves that respectively communicate with the corresponding leader receiving portions and that accommodate the respective retaining spring portions.

13. The recording tape cartridge of claim 10, wherein each of the pair of leader holding members is made of metal.

14. The recording tape cartridge of claim 10, wherein the fixed portion and the overhanging portion are formed in the same plane.

15. The recording tape cartridge of claim 10, wherein the fixed portion and the overhanging portion are substantially parallel and include a step portion therebetween.

16. The recording tape cartridge of claim 10, wherein the position-fixing structures include a support surface which forms part of an inner surface of the case, and above which is placed a surface that continues from the overhanging portion to the corresponding fixed portion of at least one of the pair of leader holding members, and that constitutes the same surface as a surface of the overhanging portion.

17. The recording tape cartridge of claim 10, wherein the position-fixing structures include:
 a projection that is formed on a support surface which forms part of an inner surface of the case, and above which is placed a surface that continues from the overhanging portion to the corresponding fixed portion of at least one of the pair of leader holding members, and that constitutes the same surface as a surface of the overhanging portion; and
 a cutaway portion that is formed at the same surface as the overhanging portion, and that continues from the overhanging portion towards the fixed portion of at least one of the pair of leader holding members, and into which the projection is inserted.

18. The recording tape cartridge of claim 10, wherein the position-fixing structures include a wall portion that is provided around edges of a support surface forming part of an inner surface of the case, and above which is placed a surface that continues from the overhanging portion to the fixed portion of at least one of the pair of leader holding members, and that forms the same surface as a surface of the overhanging portion, and the wall portion defines the placement position of the at least one of the pair of leader holding members.

* * * * *